United States Patent
Takahashi et al.

(10) Patent No.: US 8,342,284 B2
(45) Date of Patent: Jan. 1, 2013

(54) WORK VEHICLE

(75) Inventors: Hirotaka Takahashi, Komatsu (JP);
Toru Shiina, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/392,376

(22) PCT Filed: Sep. 1, 2010

(86) PCT No.: PCT/JP2010/064878
§ 371 (c)(1),
(2), (4) Date: Feb. 24, 2012

(87) PCT Pub. No.: WO2011/027760
PCT Pub. Date: Mar. 10, 2011

(65) Prior Publication Data
US 2012/0152641 A1   Jun. 21, 2012

(30) Foreign Application Priority Data
Sep. 3, 2009   (JP) ................................. 2009-204037

(51) Int. Cl.
*B60K 17/10* (2006.01)
(52) U.S. Cl. ............................ 180/307; 180/305; 60/428
(58) Field of Classification Search .................. 180/305, 180/306, 307, 308; 60/428, 431, 445, 487, 60/490
See application file for complete search history.

(56) References Cited

U.S. PATENT DOCUMENTS

| | | | |
|---|---|---|---|
| 6,209,675 B1 * | 4/2001 | Hayashi et al. | 180/307 |
| 6,915,631 B2 * | 7/2005 | Kado et al. | 60/394 |
| 7,469,534 B2 * | 12/2008 | Nishi et al. | 60/428 |
| 7,771,314 B2 * | 8/2010 | Eguchi et al. | 477/110 |

FOREIGN PATENT DOCUMENTS

| | | |
|---|---|---|
| JP | 57-129959 A | 8/1982 |
| JP | 2002-156038 A | 5/2002 |
| JP | 2004-232469 A | 8/2004 |

OTHER PUBLICATIONS

International Search Report of corresponding PCT Application No. PCT/JP2010/064878.

* cited by examiner

*Primary Examiner* — John Walters
(74) *Attorney, Agent, or Firm* — Global IP Counselors

(57) ABSTRACT

In a work vehicle, a cutoff-pressure-setting part sets cutoff pressure at a predetermined first pressure value when vehicle speed is greater than a predetermined first speed threshold, and at a second pressure value greater than the first pressure value when vehicle speed is equal to or less than a second speed threshold less than the first speed threshold. When the vehicle is moving forward and the forward/backward switch lever is in forward motion position, or when the vehicle is moving backward and the forward/backward switch lever is in backward motion position, the second speed threshold is set to a predetermined first value. When the vehicle is moving forward and the forward/backward switch lever is in backward motion position or when the vehicle is moving backward and the forward/backward switch lever is in forward motion position, the second speed threshold is set to a second value lower than the first value.

5 Claims, 6 Drawing Sheets

| VEHICLE STATUS | CONDITIONS |
|---|---|
| 1 | "IN FORWARD DRIVE" AND "FORWARD MOTION POSITION" |
| 2 | "IN BACKWARD DRIVE" AND "BACKWARD MOTION POSITION" |
| 3 | "IN FORWARD DRIVE" AND "BACKWARD MOTION POSITION" |
| 4 | "IN BACKWARD DRIVE" AND "FORWARD MOTION POSITION" |
| 5 | "PARKED" |

WORK VEHICLE

CROSS-REFERENCE TO RELATED APPLICATIONS

This application claims priority to Japanese Patent Application No. 2009-204037 filed on Sep. 3, 2009, the disclosure of which is hereby incorporated herein by reference in its entirety.

FIELD OF THE INVENTION

The present invention relates to a work vehicle.

BACKGROUND ART

In a work vehicle equipped with a so-called Hydrostatic transmission (HST) circuit, a hydraulic pump is driven by an engine, and hydraulic fluid discharged from the hydraulic pump is supplied to a hydraulic motor. A drive wheel is then driven by the hydraulic motor, propelling the vehicle forward.

As an example of such a work vehicle, there is known a vehicle as disclosed in Japanese Laid-Open Patent Application Publication No. 2004-232469, in which the displacement of the hydraulic pump is controlled so that the pressure of hydraulic fluid circulating through a hydraulic drive circuit (hereafter referred to as "drive circuit hydraulic pressure") does not surpass a predetermined cutoff pressure. In such a work vehicle, when the drive circuit hydraulic pressure reaches or exceeds the cutoff pressure, a cutoff valve reduces pilot pressure supplied to a pump displacement regulator. Because of this, the pump displacement regulator reduces the displacement of the hydraulic pump. As a result, the drive circuit hydraulic pressure is limited so as not to surpass the cutoff pressure. It is also possible to change the cutoff pressure to either of a high value and a low value in such a work vehicle by adjusting the pilot pressure supplied to the cutoff valve. Through this, the cutoff pressure can be easily set to a level appropriate to operating conditions. For example, when engaging in light work, the cutoff pressure of the cutoff valve can be adjusted so as not to generate high traction, preventing tire slippage from occurring.

SUMMARY

In a work vehicle such as that described above, it is desirable that cutoff pressure be set to a low value when vehicle speed is high, and that cutoff pressure be changed to a high value when vehicle speed falls under a predetermined threshold. This is because the traction of the vehicle becomes greater the lower the vehicle speed falls, but if cutoff pressure is maintained at a low level until the vehicle is traveling at a low speed, vehicle traction at low speeds is limited due to an increase in drive circuit hydraulic pressure being restricted.

Meanwhile, in a work vehicle, an operator can switch between forward and backward drive by manipulating a forward/backward switching member. Here, the operator may not necessarily operate the forward/backward switching member when the vehicle is in a parked state. For instance, the forward/backward switching member may be switched from forward motion position to backward motion position while the vehicle is moving forward. Conversely, the forward/backward switching member may also be switched from backward motion position to forward motion position while the vehicle is moving backward. When operation occurs in this manner, drive circuit hydraulic pressure is liable to increase greatly. However, when cutoff pressure is set at a high value in such a situation, an increase in drive circuit hydraulic pressure cannot be prevented, and a great load is placed upon the hydraulic motor.

An objective of the present invention is to provide a work vehicle in which large increases in drive circuit hydraulic pressure when the vehicle is switched between forward and backward drive can be prevented.

A work vehicle according to a first aspect has an engine, a hydraulic pump, a drive circuit, a hydraulic motor, a drive wheel, a forward/backward switching member, a forward/backward detector, a pump displacement control part, a vehicle speed detector, and a cutoff-pressure-setting part. The hydraulic pump is a variable displacement pump driven by the engine. The drive circuit is a hydraulic circuit in which flows hydraulic fluid discharged by the hydraulic pump. The hydraulic motor is driven by hydraulic fluid supplied via the drive circuit. The drive wheel is driven by the hydraulic motor. The forward/backward switching member is configured to be operated in order to indicate a switch between forward and backward drive of the vehicle. The forward/backward detector detects whether the vehicle is moving forward or backward. The pump displacement control part is configured to control the displacement of the hydraulic pump so that drive circuit hydraulic pressure, which is the pressure of the hydraulic fluid driving the hydraulic motor, does not surpass a predetermined cutoff pressure. The vehicle speed detector detects vehicle speed. The cutoff-pressure-setting part sets cutoff pressure to a predetermined first pressure value when the vehicle speed is greater than a predetermined first speed threshold. The cutoff-pressure-setting part is configured to set cutoff pressure to a value greater than the first pressure value when the vehicle speed is less than a predetermined second speed threshold that is smaller than the first speed threshold. When the forward/backward switching member indicates forward drive and the forward/backward detector detects that the vehicle is moving forward, or when the forward/backward switching member indicates backward drive and the forward/backward detector detects that the vehicle is moving backward, the cutoff-pressure-setting part is configured to set the second speed threshold to a predetermined first value. When the forward/backward switching member indicates forward drive and the forward/backward detector detects that the vehicle is moving backward, or when the forward/backward switching member indicates backward drive and the forward/backward detector detects that the vehicle is moving forward, the cutoff-pressure-setting part is configured to set the second speed threshold to a second value that is less than the first value.

A work vehicle according to a second aspect is a work vehicle according to the first aspect wherein the cutoff-pressure-setting part is configured to set the cutoff pressure to either the first pressure value or a second pressure value that is greater than the first pressure value.

A work vehicle according to a third aspect is a work vehicle according to the first aspect wherein the cutoff-pressure-setting part is configured to set cutoff pressure at a value that changes according to the vehicle speed between the first pressure value and a second pressure value that is greater than the first pressure value.

A work vehicle according to a fourth aspect is a work vehicle according to the first aspect wherein the pump displacement control part has a cutoff valve configured to change the cutoff pressure according to a supplied pilot pressure. The cutoff-pressure-setting part has an electromagnetic control valve and an electronic controller. The electromagnetic control valve is configured to control a pilot pressure supplied to the cutoff valve according to an input command signal. The electronic controller is configured to output a command signal to the electromagnetic control valve and electronically control the electromagnetic control valve.

A work vehicle according to a fifth aspect is a work vehicle according to any one of the first through fourth aspects, further having an accelerator operating member and an accelerator operation amount detector. The accelerator operating member is configured to be operated to indicate the rotation rate of the engine. The accelerator operation amount detector detects the operation amount of the accelerator operating member. The second value is set according to the operation amount of the accelerator operating member detected by the accelerator operation amount detector.

In the work vehicle according to the first aspect, the second speed threshold is set to the first value during normal driving state. The normal driving state is a state in which the forward/backward switching member indicates forward drive and the forward/backward detector detects that the vehicle is moving forward, or a state in which the forward/backward switching member indicates backward drive and the forward/backward detector detects that the vehicle is moving backward. In drive switching state, the second speed threshold is set as the second value smaller than the first value. The drive switching state is a state in which the forward/backward switching member indicates forward drive and the forward/backward detector detects that the vehicle is moving backward, or a state in which the forward/backward switching member indicates backward drive and the forward/backward detector detects that the vehicle is moving forward. Thus, in the drive switching state, cutoff pressure is maintained at the low-pressure first pressure value until vehicle speed decreases from the first value to the second value or below. Large increases in drive circuit hydraulic pressure can thereby be prevented.

In the work vehicle according to the second aspect, cutoff pressure is set at two levels, the first pressure value and the second pressure value.

In the work vehicle according to the third aspect, cutoff pressure is changed across a range of discrete or continuous degrees between the first pressure value and the second pressure value according to vehicle speed. Because of this, more precise control of cutoff pressure according to vehicle speed is possible.

In the work vehicle according to the fourth aspect, the second speed threshold is set by electronically controlling the electromagnetic control valve. It is thereby possible to set the second speed threshold to a desired value by employing a simple configuration.

In the work vehicle according to the fifth aspect, the second value of the second speed threshold is set according to the operation amount of the accelerator operating member. More precise control of cutoff pressure according to the vehicle driving state is thereby made possible.

DETAILED DESCRIPTION OF THE EMBODIMENTS

Overall Configuration

Figure 1:
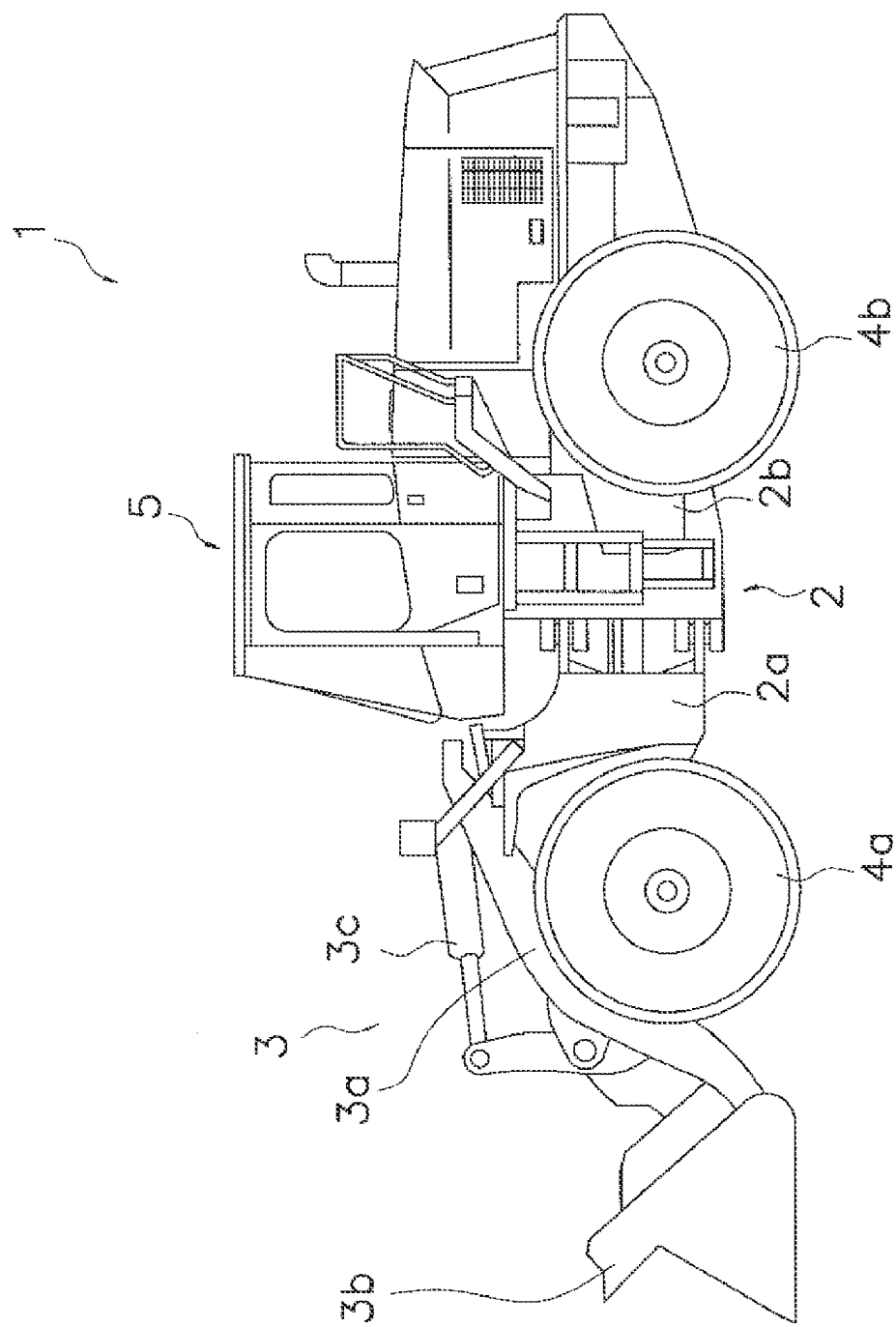
FIG. 1 is a side view of a work vehicle.

FIG. 1 is a side view of a construction vehicle 1 according to a first embodiment of the present invention. This construction vehicle 1 is a wheel loader that is capable of self-propulsion by tires 4a and 4b and can perform a desired type of work using a work machine 3. The construction vehicle 1 is provided with a body frame 2, a work machine 3, tires 4a and 4b, and an operator cab 5.

The body frame 2 has a front frame 2a frontwardly disposed and a rear frame 2b rearwardly disposed, and the front frame 2a and rear frame 2b are connected with a central part of the body frame 2 so as to be capable of swinging in the lateral direction.

The work machine 3 and a pair of front tires 4a are attached to the front frame 2a. The work machine 3 is an apparatus driven by hydraulic fluid pumped by a second hydraulic pump 14 (see FIG. 2), and has a lift arm 3a mounted to a front part of the front frame 2a, a basket 3b attached to an end of the lift arm 3a, a lift cylinder (not illustrated) that drives the lift arm 3a, and a tilt cylinder 3c that drives the basket 3b. The pair of front tires 4a is provided on side surfaces of the front frame 2a.

The operator cab 5, a pair of rear tires 4b, and the like are is provided on the rear frame 2b. The operator cab 5 is mounted on an upper part of the body frame 2, and is furnished in its interior with operating parts such as a steering wheel, an accelerator pedal, and the like; a display part that displays various types of information such as vehicle speed; a seat; and the like. The pair of rear tires 4b is provided on side surfaces of the rear frame 2b.

Also a hydraulic drive mechanism for driving the tires 4a and 4b as drive wheels and the work machine 3 is mounted on the body frame 2. The structure of the hydraulic drive mechanism will be explained below with reference to FIG. 2.

Hydraulic Drive Mechanism

The hydraulic drive mechanism primarily has an engine 10, a first hydraulic pump 11 for traveling, a pump displacement control part 30, a charge pump 13, a second hydraulic pump 14 for a work machine, a hydraulic motor 15 for traveling, a motor displacement control part 16, an inching operation part 17, a forward/backward switching operation part 18, a controller 19, and the like. In the hydraulic drive mechanism, a closed HST circuit is formed by the first hydraulic pump 11 and the hydraulic motor 15.

The engine 10 is a diesel engine, and output torque generated by the engine 10 is conveyed to the first hydraulic pump 11, the charge pump 13, and the second hydraulic pump 14. A fuel injector device 21 that controls the output torque and the rotation rate of the engine 10 is attached to the engine 10. The fuel injector device 21 adjusts a rotation rate command value of the engine 10 according to the amount by which an accelerator pedal 22 is operated (hereafter "accelerator operation amount"), adjusting the amount of fuel injected. The accelerator pedal 22 constitutes means for indicating the target number of rotations for the engine 10, and is provided with an accelerator operation amount detector 23. The accelerator operation amount detector 23 includes a potentiometer or the like, and detects the accelerator operation amount. The accelerator operation amount detector 23 sends an opening angle signal indicating accelerator operation amount to the controller 19, and a command signal is outputted from the controller 19 to the fuel injector device 21. The operator is thereby able to control the rotation rate of the engine 10 by adjusting the operation amount of the accelerator pedal 22. The engine 10 is also provided with an engine-rotation-rate detector 25 is composed of a rotational sensor that detects the actual rotation rate of the engine 10. A detection signal indicating the rotation rate of the engine 10 is input from the engine-rotation-rate detector 25 to the controller 19.

The first hydraulic pump 11 is a variable displacement hydraulic pump whose displacement can be altered by modifying the angle of a swashplate, and is driven by the engine 10. Hydraulic fluid pumped out of the first hydraulic pump 11 is sent to the hydraulic motor 15 via drive circuits 26 and 27. The drive circuit 26 is a conduit (hereafter, "forward drive circuit 26") that supplies hydraulic fluid to the hydraulic motor 15 so as to drive the hydraulic motor 15 in a direction such that the vehicle will advance. The drive circuit 27 is a conduit (hereafter, "backward drive circuit 27") that supplies hydraulic fluid to the hydraulic motor 15 so as to drive the hydraulic motor 15 in a direction such that the vehicle will move in reverse.

The pump displacement control part 30 controls the displacement of the first hydraulic pump 11 by modifying the angle of tilt of the swashplate of the first hydraulic pump 11. The pump displacement control part 30 has a pump displacement control cylinder 31, an electromagnetic direction control valve 32, and a cutoff valve 33.

The pump displacement control cylinder 31 actuates a piston 34 according to the pressure supplied by the hydraulic fluid. The pump displacement control cylinder 31 has a first fluid sump 31a and a second fluid sump 31b, and the position of the piston 34 is modified according to the balance between the hydraulic pressure within the first fluid sump 31a and the hydraulic pressure within the second fluid sump 31b. The piston 34 is connected to the swashplate of the first hydraulic pump 11, and the angle of the swashplate is modified by the movement of the piston 34.

The electromagnetic direction control valve 32 is an electromagnetic control valve that controls the pump displacement control cylinder 31 based on a command signal from the controller 19. The electromagnetic direction control valve 32 is capable of controlling the direction in which hydraulic fluid is supplied to the pump displacement control cylinder 31 based on a command signal from the controller 19. Thus, by electronically controlling the electromagnetic direction control valve 32, the controller 19 can alter the direction in which hydraulic fluid is pumped out of the first hydraulic pump 11. The electromagnetic direction control valve 32 switches between a forward drive mode F, a backward drive mode R, and a neutral mode N.

When in forward drive mode F, the electromagnetic direction control valve 32 connects a first pilot circuit 36 and a main pilot circuit 35 described below, and connects a second pilot circuit 37 and a drainage circuit 39. The drainage circuit 39 is connected to a tank 40. The first pilot circuit 36 is connected to the first fluid sump 31a of the pump displacement control cylinder 31. The second pilot circuit 37 is connected to the second fluid sump 31b of the pump displacement control cylinder 31. Because of this, when the electromagnetic direction control valve 32 is in the forward drive mode F, hydraulic fluid is supplied to the first fluid sump 31a via the main pilot circuit 35 and the first pilot circuit 36, and hydraulic fluid is discharged from the second fluid sump 31b. Through this, the swashplate angle of the first hydraulic pump 11 is changed to a direction such that displacement towards the forward drive circuit 26 increases.

When the electromagnetic direction control valve 32 is in the backward drive mode R, the electromagnetic direction control valve 32 connects the second pilot circuit 37 and the main pilot circuit 35, and connects the first pilot circuit 36 and the drainage circuit 39. Because of this, when the electromagnetic direction control valve 32 is in backward drive mode R, hydraulic fluid is supplied to the second fluid sump 31b via the main pilot circuit 35 and the second pilot circuit 37. Through this, the tilt angle of the first hydraulic pump 11 is changed to a direction such that displacement towards the backward drive circuit 27 increases. When the electromagnetic direction control valve 32 is in neutral mode N, both the first pilot circuit 36 and the second pilot circuit 37 are connected to the drainage circuit 39.

The charge pump 13 is driven by the engine 10, and is a fixed displacement pump that discharges hydraulic fluid. The hydraulic fluid discharged by the charge pump 13 is supplied to the electromagnetic direction control valve 32 via a charge circuit 42, an engine sensing valve 43, and the main pilot circuit 35. The charge pump 13 supplies hydraulic fluid to the electromagnetic direction control valve 32 in order to actuate the pump displacement control cylinder 31. The engine sensing valve 43 converts hydraulic pressure from the charge pump 13 into hydraulic pressure according to the engine rotation rate. Thus, the engine sensing valve 43 changes the pressure of the main pilot circuit 35 according to the engine rotation rate. Specifically, when the engine rotation rate increases, the engine sensing valve 43 increases the pressure of the main pilot circuit 35. Alterations in the pressure of the main pilot circuit 35 by the engine sensing valve 43 increase and decrease the displacement of the first hydraulic pump 11 described above.

The cutoff valve 33 is connected to the main pilot circuit 35. A first pilot port 33a of the cutoff valve 33 is connected to the forward drive circuit 26 via a check valve 45, and to the backward drive circuit 27 via a check valve 46. A second pilot port 33b of the cutoff valve 33 is connected to the charge circuit 42 via a cutoff pilot circuit 48 and a cutoff pressure control valve 51, described below. The cutoff valve 33 is switched between an open state and a closed state according to the hydraulic pressure of the drive circuits 26 and 27 (hereafter, "drive circuit hydraulic pressure"). The cutoff valve 33 thereby limits drive circuit hydraulic pressure so as not to surpass a set cutoff pressure value. Specifically, when drive circuit hydraulic pressure reaches or surpasses a set cutoff pressure value, the cutoff valve 33 connects the main pilot circuit 35 and the drainage circuit 39, and reduces the pressure of the main pilot circuit 35 (hereafter, "main pilot circuit pressure"). When the main pilot circuit pressure is reduced, the pilot pressure being supplied to the pump displacement control cylinder 31 via the electromagnetic direction control valve 32 is reduced. As a result, the displacement of the first hydraulic pump 11 is reduced, and drive circuit hydraulic pressure is reduced. The pump displacement control part 30 thereby controls the displacement of the first hydraulic pump 11 so that the drive circuit hydraulic pressure does not surpass a predetermined cutoff pressure value.

The cutoff valve 33 is also capable of altering the cutoff pressure according to the pilot pressure being supplied to the second pilot port 33b. Specifically, when hydraulic fluid is not being supplied to the second pilot port 33b of the cutoff valve 33, the cutoff pressure is set to a predetermined first pressure value PL (see FIG. 6). When hydraulic fluid is being supplied to the second pilot port 33b of the cutoff valve 33, the cutoff pressure is set to a second pressure value PH that is greater than the first pressure value PL (see FIG. 6).

The cutoff pressure control valve 51 is an electromagnetic control valve that is electronically controlled by a command signal from the controller 19, and is switched between two levels, an excited state and an unexcited state. When in the excited state, the cutoff pressure control valve 51 connects the cutoff pilot circuit 48 and the drainage circuit 39. Hydraulic fluid is thereby expelled from the second pilot port 33b of the cutoff valve 33, and the cutoff pressure of the cutoff valve 33 is set at the low first pressure value PL. When in the unexcited state, the cutoff pressure control valve 51 connects the charge circuit 42 and the cutoff pilot circuit 48. Hydraulic fluid is thereby supplied to the second pilot port 33b of the cutoff valve 33, and the cutoff pressure of the cutoff valve 33 is set at the high second pressure value PH. The cutoff pressure control valve 51 is thus capable of controlling the pilot pressure supplied to the second pilot port 33b of the cutoff valve 33 according to a command signal input from the controller 19.

The charge circuit 42 is connected to the drainage circuit 39 via a first relief valve 52. The first relief valve 52 limits the hydraulic pressure of the charge circuit 42 so that it does not surpass a predetermined relief pressure. The charge circuit 42 is connected to drive circuits 26 and 27 via a second relief valve 53 and check valves 54 and 55. The second relief valve 53 connects the charge circuit 42 and the drive circuits 26 and 27 when the drive circuit hydraulic pressure reaches a predetermined relief pressure. The drive circuits 26 and 27 are thereby limited so as not to surpass the predetermined relief pressure.

The second hydraulic pump 14 is driven by the engine 10. Hydraulic fluid discharged from the second hydraulic pump 14 is sent to the tilt cylinder 3c (see FIG. 1) and other components via a work machine circuit 49, driving the tilt cylinder 3c and other components.

The hydraulic motor 15 is a variable displacement hydraulic motor capable of altering displacement by altering the angle of an inclined shaft. The hydraulic motor 15 is driven by hydraulic fluid that is discharged from the first hydraulic pump 11 and supplied via the drive circuits 26 and 27. The hydraulic motor 15 thereby generates the driving force needed for traveling. By being supplied with hydraulic fluid via the forward drive circuit 26, the hydraulic motor 15 is driven in a direction corresponding to a forward movement of the vehicle. By being supplied with hydraulic fluid via the backward drive circuit 27, the hydraulic motor 15 is driven in a direction corresponding to a backward movement of the vehicle.

The driving force of the hydraulic motor 15 is conveyed to an output shaft 57 via a transfer 56, whereby the tires 4a and 4b rotate and the vehicle is propelled. The output shaft 57 is also provided with an output rotation rate detector 58. The output rotation rate detector 58 is composed of a rotational sensor that detects the rotation rate and rotational direction of the output shaft 57. The information detected by the output rotation rate detector 58 is sent to the controller 19 as a detection signal. Based on the rotation rate of the output shaft 57 detected by the output rotation rate detector 58, the controller 19 is able to determine whether the vehicle is moving forward or backward, or if it is parked. As such, the output rotation rate detector 58 functions as a forward/backward detector that detects whether the vehicle is moving forward or backward.

The motor displacement control part 16 controls the displacement of the hydraulic motor 15 (hereafter simply "motor displacement") by controlling the angle of incline of an inclined shaft of the hydraulic motor 15. The motor displacement control part 16 has a motor displacement control cylinder 61, a motor displacement control valve 62, a pilot pressure control valve 63, and a forward/backward switching valve 64.

The motor displacement control cylinder 61 actuates a piston 65 according to the pressure of the supplied hydraulic fluid. The motor displacement control cylinder 61 has a first fluid sump 61a and a second fluid sump 61b, and the position of the piston 65 is modified according to the balance between the hydraulic pressure within the first fluid sump 61a and the hydraulic pressure within the second fluid sump 61b. The piston 65 is connected to the inclined shaft of the hydraulic motor 15, and the angle of the inclined shaft is modified by the movement of the piston 65.

The motor displacement control valve 62 controls the motor displacement control cylinder 61 according to the pilot pressure being supplied. The motor displacement control valve 62 is switched between a first state and a second state according to the pilot pressure being supplied to pilot port 62a. In the first state, the motor displacement control valve 62 connects a first motor cylinder circuit 66 and a second motor cylinder circuit 67. The first motor cylinder circuit 66 is a circuit connecting the forward/backward switching valve 64 and the first fluid sump 61a of the motor displacement control cylinder 61. The second motor cylinder circuit 67 is a circuit connecting the motor displacement control valve 62 and the second fluid sump 61b of the motor displacement control cylinder 61. When the motor displacement control valve 62 is in the first state, hydraulic fluid is supplied to the second fluid sump 61b of the motor displacement control cylinder 61. The piston 65 of the motor displacement control cylinder 61 is thereby actuated so that motor displacement decreases. When the motor displacement control valve 62 is in the second state, the motor displacement control valve 62 connects the second motor cylinder circuit 67 and a drainage circuit 41. The drainage circuit 41 is connected to the tank 40 via a check valve 44. For this reason, hydraulic fluid is discharged from the second fluid sump 61b of the motor displacement control cylinder 61. The piston 65 of the motor displacement control cylinder 61 is thereby actuated so that motor displacement increases. As described above, the motor displacement control valve 62 controls the direction and amount of hydraulic fluid supplied to motor displacement control cylinder 61 according to the pilot pressure supplied to the pilot port 62a. The motor displacement control valve 62 is thereby capable of controlling motor displacement based on pilot pressure.

The pilot pressure control valve 63 is an electromagnetic proportional control valve that is electronically controlled by a command signal from the controller 19. The pilot pressure control valve 63 controls the supply and discharge of hydraulic fluid to and from the pilot port 62a of the motor displacement control valve 62. The pilot pressure control valve 63 supplies hydraulic fluid from the charge circuit 42 to the pilot port 62a. The pilot pressure control valve 63 also discharges hydraulic fluid from the pilot port 62a to the tank 40. The pilot pressure control valve 63 is capable of controlling hydraulic pressure being supplied to the pilot port 62a of the motor displacement control valve 62 as desired according to a command signal from the controller 19. Thus, by electrically controlling the pilot pressure control valve 63, the controller 19 can control the hydraulic fluid displacement of the hydraulic motor 15 as desired. A low pressure switch valve 69 connects whichever of drive circuits 26 and 27 has lower pressure to the tank 40 via a relief valve 91.

The forward/backward switching valve 64 supplies hydraulic fluid from whichever of drive circuits 26 and 27 has higher pressure to the motor displacement control cylinder 61. Specifically, when the electromagnetic direction control valve 32 is in forward drive mode F, hydraulic fluid is supplied to a forward drive pilot port 64a of the forward/backward switching valve 64 via a forward drive pilot circuit 71 connected to the first pilot circuit 36. The forward/backward switching valve 64 is thereby shifted into forward drive mode F. When in forward drive mode F, the forward/backward switching valve 64 connects the forward drive circuit 26 and the first motor cylinder circuit 66, and connects the forward drive pilot circuit 71 to a pressure detection circuit 73. Hydraulic fluid from the forward drive circuit 26 is thereby supplied to the motor displacement control cylinder 61. The pressure detection circuit 73 is also connected to a pilot circuit pressure detector 74 comprising a hydraulic pressure sensor. Thus, the pressure of the forward drive pilot circuit 71 is detected by the pilot circuit pressure detector 74. When the electromagnetic direction control valve 32 is in backward drive mode R, hydraulic fluid is supplied to a backward drive pilot port 64b of the forward/backward switching valve 64 via a backward drive pilot circuit 72 connected to the second pilot circuit 37. The forward/backward switching valve 64 is thereby shifted into backward drive mode R. When in backward drive mode R, the forward/backward switching valve 64 connects the backward drive circuit 27 and the first motor cylinder circuit 66, and connects the backward drive pilot circuit 72 to the pressure detection circuit 73. Through this, hydraulic fluid from the backward drive circuit 27 is supplied to the motor displacement control cylinder 61. The pressure of the backward drive pilot circuit 72 is also detected by the pilot circuit pressure detector 74. The pilot circuit pressure detector 74 detects the hydraulic pressure of the forward drive pilot circuit 71 or of the backward drive pilot circuit 72, i.e., the main pilot circuit pressure, and sends it as a detection signal to the controller 19.

The hydraulic pressure of the first motor cylinder circuit 66, i.e., the drive circuit hydraulic pressure of the higher-pressured drive circuit driving the hydraulic motor 15, is detected by a drive circuit hydraulic pressure detector 76. The drive circuit hydraulic pressure detector 76 sends the detected drive circuit hydraulic pressure to the controller 19 as a detection signal.

The inching operation part 17 has an inching pedal 81 and an inching valve 82. The inching pedal 81 is provided within the operator cab 5, and is operated by the operator. When the inching pedal 81 is operated, the inching valve 82 connects the main pilot circuit 35 and the drainage circuit 39. The inching valve 82 thereby reduces the main pilot circuit pressure according to the operation amount of the inching pedal 81. The inching operation part 17 is used, for example, when one wishes to increase the rotation rate of the engine 10 but prevent an increase in traveling speed. Specifically, when the rotation rate of the engine 10 is increased by depressing the accelerator pedal 22, the main pilot circuit pressure also increases. Here, by operating the inching pedal 81 and opening the inching valve 82, it is possible to control increase in main pilot circuit pressure. It is thereby possible to prevent an increase in the displacement of the first hydraulic pump 11, and in the rotational speed of the hydraulic motor 15.

The inching valve 82 is connected to a brake valve 83 via a spring. The brake valve 83 controls the supply of hydraulic fluid to a hydraulic brake device 86. The inching pedal 81 doubles as a member for operating the hydraulic brake device 86. Until the operation amount of the inching pedal 81 reaches a predetermined level, only the inching valve 82 is operated. When the operation amount of the inching pedal 81 reaches a predetermined level, operation of the brake valve 83 commences, and, braking force is thereby generated in the hydraulic brake device 86. When the inching pedal 81 is operated at or above the predetermined level, the braking force of the hydraulic brake device 86 is controlled according to the operation amount of the inching pedal 81.

The forward/backward switching operation part 18 has a forward/backward switch lever 84 as a forward/backward switching member and a lever operation detector 85. The forward/backward switch lever 84 is provided within the operator cab 5, and is operated by the operator so as to indicate a switch between forward and backward drive in the vehicle. The forward/backward switch lever 84 is switched between a forward motion position, a backward motion position, and a neutral position. The lever operation detector 85 detects whether the forward/backward switch lever 84 is in forward motion position, backward motion position, or neutral position, and sends the results to the controller 19 as a detection signal.

Figure 3:
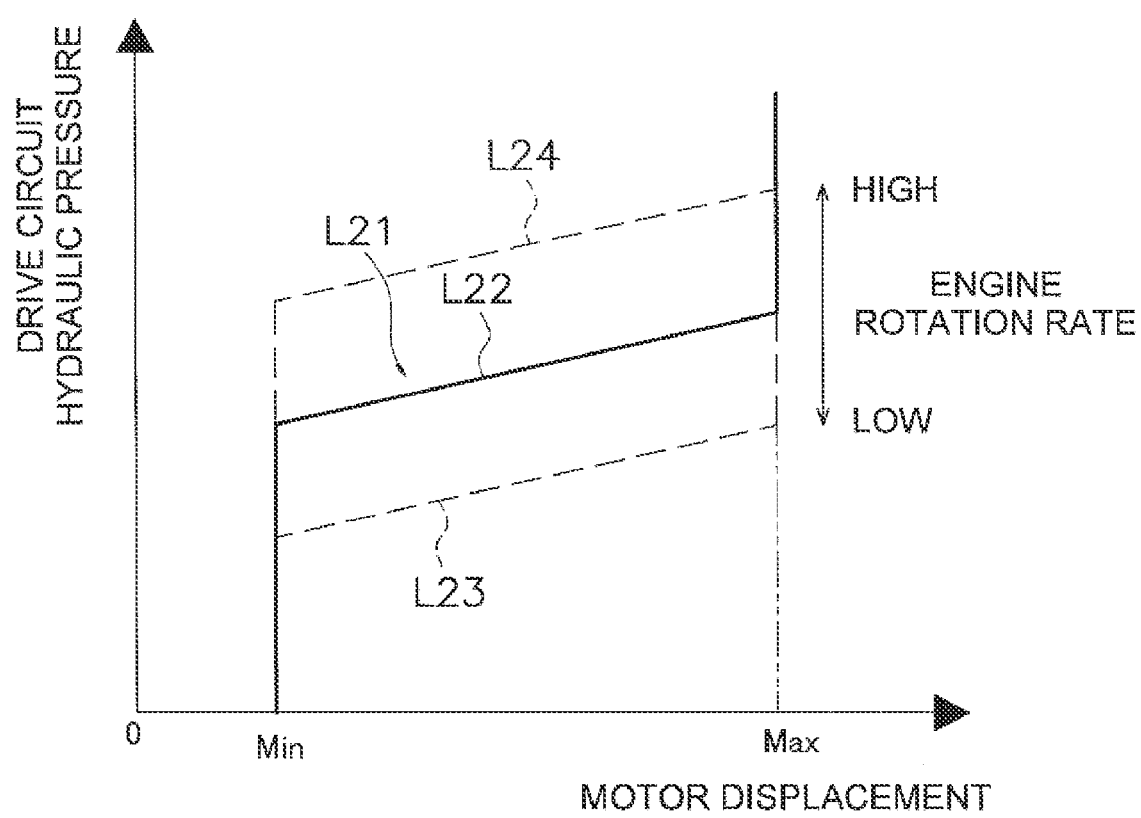
FIG. 3 is an illustration of an example of motor displacement/drive circuit hydraulic pressure profile data.

The controller 19 is an electronic controller that has a CPU, various types of memory, and the like, and electrically controls the various electromagnetic control valves and the fuel injector device 21 based on output signals from the detectors. The controller 19 thereby controls the engine rotation rate, motor displacement, and other parameters. For example, the controller 19 processes detection signals from the engine-rotation-rate detector 25 and the drive circuit hydraulic pressure detector 76, and outputs a motor displacement command signal to the pilot pressure control valve 63. The controller 19 refers to the motor displacement/drive circuit hydraulic pressure profile data stored within the controller 19. The controller 19 sets a target value for motor displacement based on the engine rotation rate and drive circuit hydraulic pressure value, and outputs a command value corresponding to the set target value to the pilot pressure control valve 63. FIG. 3 illustrates an example of motor displacement/drive circuit hydraulic pressure profile data. The solid line L21 within the graph indicates motor displacement relative to the drive circuit hydraulic pressure for a predetermined rate of engine rotation value. The motor displacement is at a minimum (Min) as long as the drive circuit hydraulic pressure does not exceed a predetermined value, whereafter the motor displacement gradually increases as drive circuit hydraulic pressure increases (the diagonal portion L22 of the solid line). When the motor displacement reaches a maximum (Max), the motor displacement remains at maximum displacement (Max) even if the pressure climbs further. The diagonal portion L22 of the solid line is set so as to go higher or lower according to the engine rotation rate. Specifically, motor displacement is controlled so that if the engine rotation rate is low, motor displacement begins increasing from a lower drive circuit hydraulic pressure, and reaches to maximum motor displacement at a lower drive circuit hydraulic pressure (see lower dotted diagonal portion L23 in FIG. 3). Conversely, motor displacement is controlled so that if the engine rotation rate is high, motor displacement is maintained at minimum motor displacement Min until the drive circuit hydraulic pressure increases further, and motor displacement reaches to maximum motor displacement Max at a higher drive circuit hydraulic pressure (see upper dotted diagonal portion L24 in FIG. 3). The traction force and vehicle speed of the construction vehicle 1 thereby change along a continuous range, and it is possible to automatically change speed from a vehicle speed of zero up to maximum vehicle speed without making a gear shifting operation (see line L1 in FIG. 6).

Control During Forward and Backward Drive

Figure 2:
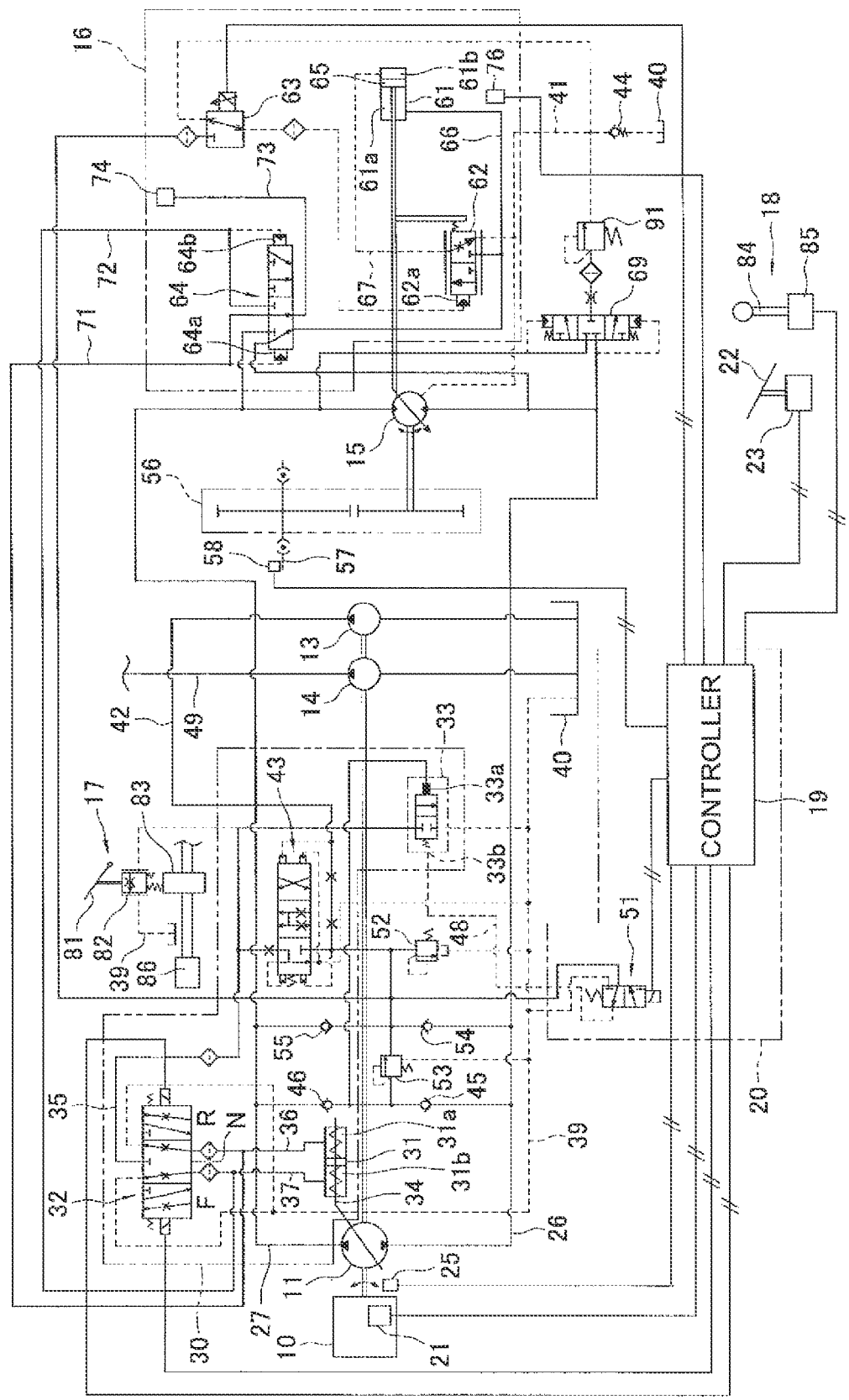
FIG. 2 is an illustration of a hydraulic drive mechanism of a work vehicle.

In the construction vehicle 1, the vehicle is switched between forward and backward drive using the forward/backward switch lever 84. An instance of control when forward drive has been selected using the forward/backward switch lever 84 will be described below with reference to FIG. 2. Hydraulic fluid discharged from the charge pump 13 is supplied to the first pilot circuit 36 via the charge circuit 42, engine sensing valve 43, main pilot circuit 35, and electromagnetic direction control valve 32. The piston 34 of the pump displacement control cylinder 31 is moved by the hydraulic fluid from first pilot circuit 36 in the leftward direction as seen in FIG. 2, and changes the swashplate angle of the first hydraulic pump 11. Here, the swashplate angle of the first hydraulic pump 11 is changed in a direction such that displacement towards the forward drive circuit 26 increases. In this state, the second pilot circuit 37 is connected to the drainage circuit 39 by the electromagnetic direction control valve 32.

The hydraulic fluid from the first pilot circuit 36 is supplied to the forward drive pilot port 64a of the forward/backward switching valve 64 via the forward drive pilot circuit 71. The forward/backward switching valve 64 is thereby shifted into forward drive mode F. In this state, the forward drive circuit 26 and the first motor cylinder circuit 66 are connected, and hydraulic fluid from the forward drive circuit 26 is supplied to the motor displacement control cylinder 61. The pressure of the forward drive circuit 26 is detected by the drive circuit hydraulic pressure detector 76 and sent as a detection signal to the controller 19. When the forward/backward switching valve 64 is in forward drive mode F, the forward drive pilot circuit 71 and the pressure detection circuit 73 are connected, and the pressure of the forward drive pilot circuit 71 is detected by the pilot circuit pressure detector 74. The pilot circuit pressure detector 74 sends the detected pressure of the forward drive pilot circuit 71 to the controller 19 as a detection signal. As described above, the controller 19 sets a motor displacement target value based on the engine rotation rate and drive circuit hydraulic pressure, i.e., the pressure level of the forward drive circuit 26 (see FIG. 3). The controller 19 then sends a command signal corresponding to the motor displacement target value to the pilot pressure control valve 63. The pilot pressure control valve 63 controls the pressure of the hydraulic fluid supplied to the pilot port 62a of the motor displacement control valve 62 based on the command signal from the controller 19. Through this, the motor displacement control valve 62 is controlled, and the position of the piston 65 of the motor displacement control cylinder 61 is adjusted. As a result, the angle of the inclined shaft is adjusted so that motor displacement reaches the target value.

There shall now be described an instance of control when backward drive has been selected using the forward/backward switch lever 84. Hydraulic fluid discharged from the charge pump 13 is supplied to the second pilot circuit 37 via the charge circuit 42, engine sensing valve 43, main pilot circuit 35, and electromagnetic direction control valve 32. The piston 34 of the pump displacement control cylinder 31 is actuated by the hydraulic fluid from the second pilot circuit 37 in the rightward direction as seen in FIG. 1, and changes the swashplate angle of the first hydraulic pump 11. Here, the swashplate angle of the first hydraulic pump 11 is changed in a direction such that displacement towards the backward drive circuit 27 increases. In this state, the first pilot circuit 36 is connected to the drainage circuit 39 by the electromagnetic direction control valve 32.

The hydraulic fluid from the second pilot circuit 37 is supplied to the backward drive pilot port 64b of the forward/backward switching valve 64 via the backward drive pilot circuit 72. The forward/backward switching valve 64 is thereby shifted into backward drive mode R. In this state, the backward drive circuit 27 and the first motor cylinder circuit 66 are connected, and hydraulic fluid from the backward drive circuit 27 is supplied to the motor displacement control cylinder 61. The pressure level of the backward drive circuit 27 is detected by the drive circuit hydraulic pressure detector 76 and sent as a detection signal to the controller 19. When the forward/backward switching valve 64 is in backward drive mode R, the backward drive pilot circuit 72 and the pressure detection circuit 73 are connected, and the pressure level of the backward drive pilot circuit 72 is detected by the pilot circuit pressure detector 74. The pilot circuit pressure detector 74 sends the detected pressure level of the backward drive pilot circuit 72 to the controller 19 as a detection signal. As described above, the controller 19 sets a motor displacement target value based on the engine rotation rate and the pressure level of the backward drive circuit 27 (see FIG. 3). The controller 19 then sends a command signal corresponding to the motor displacement target value to the pilot pressure control valve 63. The pilot pressure control valve 63 controls the pressure of the hydraulic fluid supplied to the pilot port 62a of the motor displacement control valve 62 based on the command signal from the controller 19. The motor displacement control valve 62 is thereby controlled, and the position of the piston 65 of the motor displacement control cylinder 61 is thereby adjusted. As a result, the angle of the inclined shaft is adjusted so that motor displacement reaches the target value.

Control of Cutoff Valve 33

Figure 4:
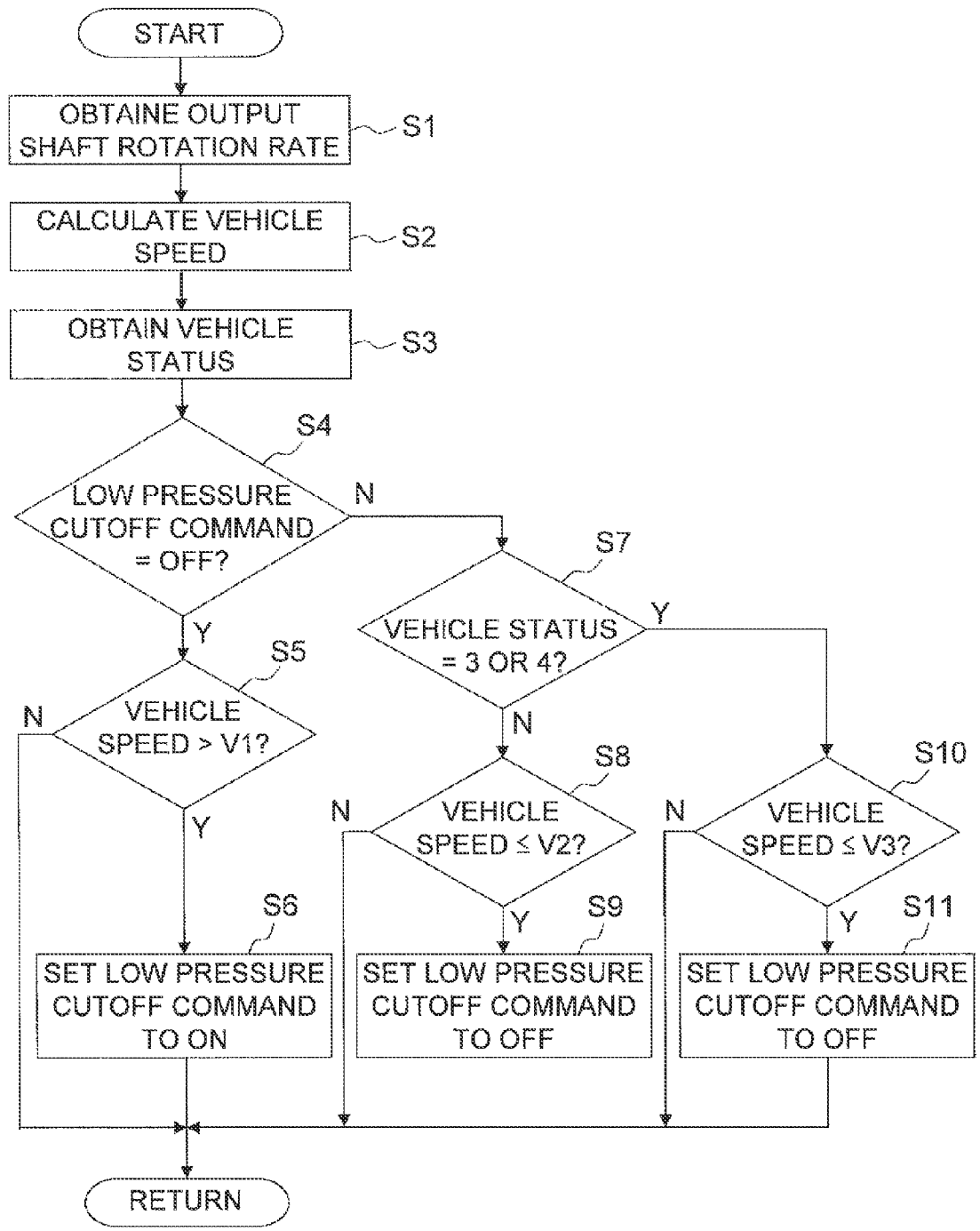
FIG. 4 is a flowchart illustrating the control of a cutoff valve.

As described above, the cutoff pressure control valve 51 is capable of controlling the pilot pressure supplied to the cutoff valve 33 according to a command signal input from the controller 19. Thus, by controlling the cutoff pressure control valve 51 based on the command signal, the controller 19 is capable of setting the cutoff pressure of the cutoff valve 33 to either a low first pressure value PL or a high second pressure value PH. Specifically, when the controller 19 is outputting a low-pressure cutoff command described below to the cutoff pressure control valve 51, the cutoff pressure control valve 51 enters the excited state. Through this, the cutoff pressure of the cutoff valve 33 is set at the low first pressure value PL. When the controller 19 is not outputting the low-pressure cutoff command to the cutoff pressure control valve 51, i.e., when no command signal input is being received by the cutoff pressure control valve 51, the cutoff pressure control valve 51 enters the unexcited state. Through this, the cutoff pressure of the cutoff valve 33 is set to the high second pressure value PH. In this way, the controller 19 and the cutoff pressure control valve 51 constitute a cutoff-pressure-setting part 20 that sets the cutoff pressure of the cutoff valve 33 to the first pressure value PL or the second pressure value PH according to vehicle speed. Control of cutoff pressure using the cutoff-pressure-setting part 20 will be described below with reference to the flowchart in FIG. 4.

First, in step S1, the rotation rate of the output shaft 57 is obtained. Here, the controller 19 obtains the rotation rate of the output shaft 57 based on the detection signal from the output rotation rate detector 58.

In step S2, vehicle speed is calculated. Here, the controller 19 calculates vehicle speed based on the rotation rate of output shaft 57 obtained in step S1. Specifically, the output rotation rate detector 58 functions as a vehicle speed detector that detects vehicle speed.

In step S3, vehicle status is obtained. Here, the controller 19 determines that the vehicle is in one of the five types of status shown in FIG. 5, based on the detection signal from the output rotation rate detector 58 and the detection signal from the lever operation detector 85. Specifically, the controller 19 determines whether the vehicle is "in forward drive", "in backward drive", or "parked", based on the detection signal from the output rotation rate detector 58. The controller 19 also determines whether the forward/backward switch lever 84 is in "forward motion position", "backward motion position", or "neutral position", based on the detection signal from the lever operation detector 85. When the vehicle is "in forward drive" and the forward/backward switch lever 84 is in "forward motion position", the controller 19 determines the status to be "1". When the vehicle is "in backward drive" and the forward/backward switch lever 84 is in "backward motion position", the controller 19 determines the status to be "2". When the vehicle is "in forward drive" and the forward/backward switch lever 84 is in "backward motion position", the controller 19 determines the status to be "3". When the vehicle is "in backward drive" and the forward/backward switch lever 84 is in "forward motion position", the controller 19 determines the status to be "4". When the vehicle is "parked", the controller 19 determines the status to be "5" regardless of the position of the forward/backward switch lever 84.

Next, in step S4, a decision is made as to whether or not the low-pressure cutoff command is currently OFF. Here, it is determined whether the low-pressure cutoff command from the controller 19 to the cutoff pressure control valve 51 is OFF or ON. When the low-pressure cutoff command is determined to be OFF, that is, when the cutoff pressure of the cutoff valve 33 is set to the high second pressure value PH, the procedure continues to step S5.

Figures 5, 6:
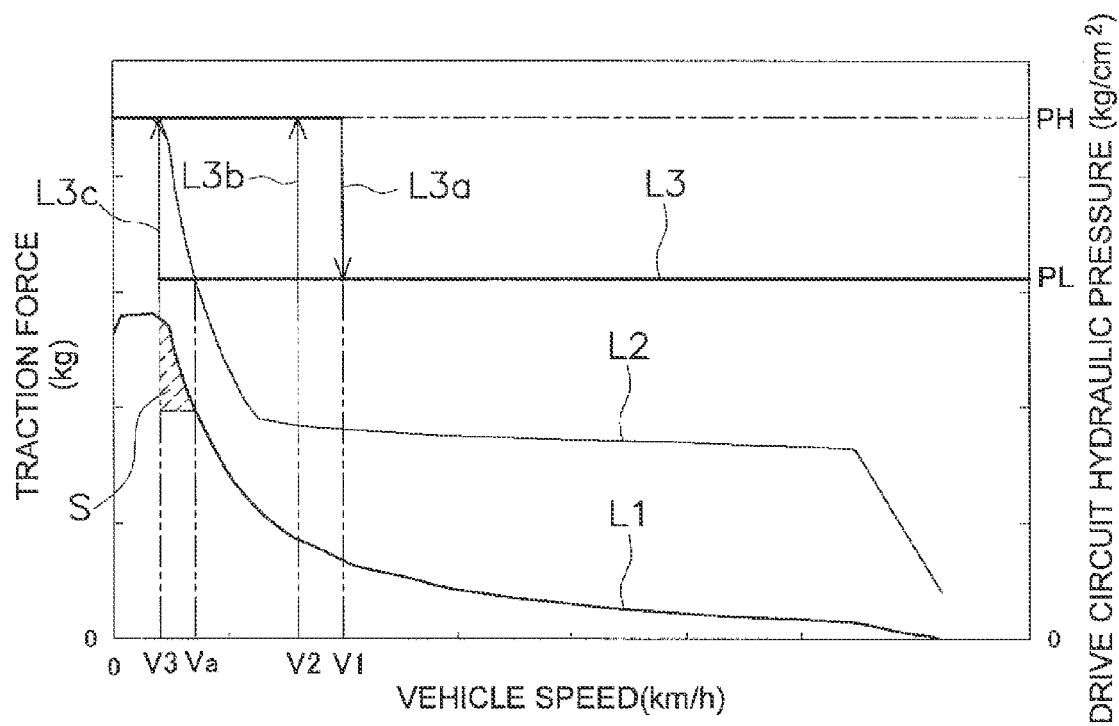
FIG. 5 is a table illustrating vehicle statuses and conditions for each status.
FIG. 6 is a graph showing change in maximum traction force, necessary drive circuit hydraulic pressure, and maximum drive circuit hydraulic pressure against vehicle speed.

In step S5, it is determined whether vehicle speed is greater than a predetermined speed threshold V1 or not (see FIG. 6). When vehicle speed is greater than the predetermined speed threshold V1 (first speed threshold), the procedure continues to step S6. When vehicle speed is equal to or less than the predetermined speed threshold V1, the low-pressure cutoff command is kept OFF.

In step S6, the low-pressure cutoff command is set to ON. Specifically a low-pressure cutoff command is issued from the controller 19 to the cutoff pressure control valve 51. The cutoff pressure of the cutoff valve 33 is thereby changed from the high second pressure value PH to the low first pressure value PL as shown in FIG. 6 (see line L3a). The drive circuit hydraulic pressure is thereby kept from surpassing the first pressure value PL. In FIG. 6, line L1 indicates maximum vehicle traction force against vehicle speed. Line L2 indicates the drive circuit hydraulic pressure necessary to generate the maximum traction force indicated by line L1 (hereafter, "necessary drive circuit hydraulic pressure"). Line L3 indicates the upper limit for cutoff pressure, i.e., drive circuit hydraulic pressure as set by the cutoff valve 33.

In step S4, when the low-pressure cutoff command is determined not to be OFF, i.e., when the cutoff pressure of the cutoff valve 33 is set at the low first pressure value PL, the procedure continues to step S7.

In step S7, it is determined whether the vehicle is in status "3" or status "4". If the vehicle is not in status "3" or status "4", i.e., if the vehicle is in status "1", "2", or "5", the procedure continues to step S8. As described above, status "1" is when the vehicle is "in forward drive" and the forward/backward switch lever 84 is in "forward motion position". Status "2" is when the vehicle is "in backward drive" and the forward/backward switch lever 84 is in "backward motion position". Status "5" is when the vehicle is "parked". Thus, when the vehicle movement direction indicated by the forward/backward switch lever 84 and the actual vehicle movement direction match, or when the vehicle is parked, the procedure continues to step S8.

In step S8, it is determined whether or not vehicle speed is equal to or less than a predetermined speed threshold V2 (second speed threshold). As illustrated in FIG. 6, the speed threshold V2 is a speed lower than the speed threshold V1 described above. The speed threshold V2 is also a speed greater than a vehicle speed Va wherein the necessary drive circuit hydraulic pressure and the drive circuit hydraulic pressure upper limit as set by the cutoff valve 33 (here, first pressure value PL) match. When vehicle speed is equal to or lower than the predetermined speed threshold V2, the procedure continues to step S9.

In step S9, the low-pressure cutoff command is set to OFF. Specifically, output of the low-pressure cutoff command from the controller 19 to the cutoff pressure control valve 51 is ceased. The cutoff pressure of the cutoff valve 33 is thereby increased from the low first pressure value PL to the high second pressure value PH (see line L3b). Thus, the upper limit for drive circuit hydraulic pressure increases from the first pressure value PL to the second pressure value PH. It is accordingly possible for drive circuit hydraulic pressure to be increased to the necessary drive circuit hydraulic pressure even at low speeds equal to or less than speed Va, enabling maximum vehicle traction force to be output.

If vehicle speed is not equal to or less than the speed threshold V2 in step S8, i.e., if vehicle speed is greater than the speed threshold V2, the low-pressure cutoff command is kept ON.

If vehicle status "3" or "4" is detected in step S7, the procedure continues to step S10. As described above, status "3" is when the vehicle is "in forward drive" and the forward/backward switch lever 84 is in "backward motion position". Status "4" is when the vehicle is "in backward drive" and the forward/backward switch lever 84 is in "forward motion position". Thus, these status levels indicate that the position of the forward/backward switch lever 84 has been reversed, but the vehicle continues to travel in the same direction.

In step S10, it is determined whether or not vehicle speed is equal to or less than a predetermined speed threshold V3. As illustrated in FIG. 6, the speed threshold V3 is a speed lower than the speed threshold V2 described above. The speed threshold V3 is also a speed lower than the vehicle speed Va wherein the necessary drive circuit hydraulic pressure and the drive circuit hydraulic pressure upper limit as set by the cutoff valve 33 (here, first pressure value PL) match. When vehicle speed is equal to or less than the predetermined speed threshold V3, the procedure continues to step S11.

In step S11, the low-pressure cutoff command is set to OFF. As in step S9, the upper limit for drive circuit hydraulic pressure is thereby increased from the low first pressure value PL to the high second pressure value PH (see line L3c in FIG. 6).

If vehicle speed is not equal to or less than the speed threshold V3 in step S10, i.e., if vehicle speed is greater than the speed threshold V3, the low-pressure cutoff command is kept ON.

In the work vehicle 1, the controller 19 sets cutoff pressure at the predetermined first pressure value PL when vehicle speed is greater than the predetermined speed threshold, and sets cutoff pressure at the second pressure value PH that is greater than the first pressure value PL when vehicle speed is equal to or less than the speed threshold. Here, if vehicle status is "1", "2", or "5" with cutoff pressure set at the low first pressure value PL, the speed threshold is set at V2 (the first value). If vehicle status is "3" or "4", the speed threshold is set at V3 (the second value), which is smaller than V2. When vehicle status is "3" or "4", the position of the forward/backward switch lever 84 has been reversed but the vehicle is still moving in the same direction; in this state, there is likely to be a large increase in the drive circuit hydraulic pressure. Thus, by reducing the speed threshold to V3 as described above, cutoff pressure is maintained at the low first pressure value PL until vehicle speed further decreases. Large increases in drive circuit hydraulic pressure can thereby be suppressed, and a large load can be prevented from being placed on the hydraulic motor 15.

The speed threshold V3 is a value that is smaller than V2 but greater than zero. For this reason, cutoff pressure is not maintained at the low first pressure value PL until the vehicle comes to a complete stop. It is accordingly possible to prevent delays in first hydraulic pump 11 displacement control response when the actual travel direction of the vehicle is switched from forward to backward, or from backward to forward.

Moreover, because speed threshold V3 is a speed less than Va, as illustrated in FIG. 6, cutoff pressure is set at a value less than the necessary drive circuit hydraulic pressure in the vehicle speed range from V3 to Va when vehicle status is "3" or "4". In such instances, it becomes impossible to increase the drive circuit hydraulic pressure to the necessary drive circuit hydraulic pressure, and impossible to output traction equivalent to portion S of the diagonal line illustrated in FIG. 6. However, when vehicle status is "3" or "4", this means that the forward/backward switch lever 84 has been operated, but the vehicle movement direction has not yet changed; in such a state, work requiring a large amount of traction is generally not performed. Thus, there is little risk of reducing operational effectiveness through control such as described above.

Other Embodiments (a) In the embodiment described above, the present invention is adopted for use in a wheel loader, but it may also be adopted for use in other kinds of work vehicles.

Figure 7:
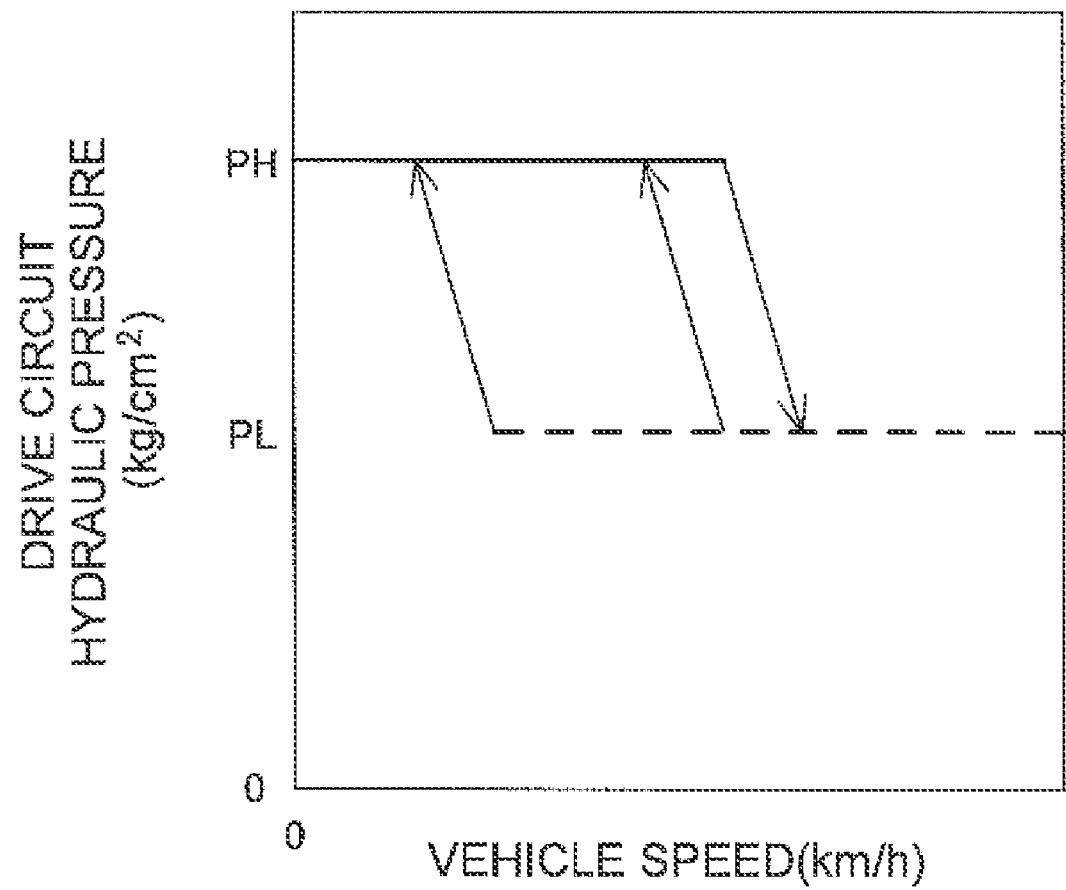
FIG. 7 is a graph illustrating the relationship between vehicle speed and cutoff pressure according to another embodiment.

(b) In the embodiment described above, a cutoff-pressure-setting part 20 switches the cutoff pressure between two discrete stages: the first pressure value PL and the second pressure value PH; however, cutoff pressure may also be set to a value between the first pressure value PL and second pressure value PH that changes according to vehicle speed. For example, cutoff pressure may be set to a greater plurality of pressure value stages between the first pressure value PL and the second pressure value PH. Alternatively, as illustrated in FIG. 7, cutoff pressure can be set to a value varying along a continuous range between the first pressure value PL and the second pressure value PH according to vehicle speed.

(c) The speed threshold V3 need not be fixed as in the embodiment described above, but rather may be set so as to vary according to the operation amount of the accelerator pedal 22 detected by the accelerator operation amount detector 23. For example, when the vehicle status is "3" or "4" and the accelerator pedal 22 is operated by a large amount, drive circuit hydraulic pressure is liable to climb, placing a large burden on the hydraulic motor 15. For this reason, the more the accelerator pedal 22 is operated, the smaller the value of the speed threshold V3 is set. The placement of large burdens on the hydraulic motor 15 can thereby be prevented. Moreover, when the accelerator pedal 22 is operated to or less than a predetermined amount, a configuration such that the speed threshold is set to a value greater than V3 even when vehicle status is "3" or "4" may be adopted.

(d) The speed threshold V3 may be equal to or greater than the vehicle speed Va described above. If the speed threshold V3 is smaller than V2, large increases in drive circuit hydraulic pressure can be prevented to a greater degree than in conventional work vehicles. However, from considerations of preventing large increases in drive circuit hydraulic pressure at lower vehicle speeds, it is preferable that speed threshold V3 be smaller than vehicle speed Va as described above.

(e) In the embodiment described above, an electromagnetic control valve was used for the pilot pressure control valve 63, but a hydraulic pilot control valve may also be used.

The present invention has the effect of making it possible to prevent large increases in drive circuit hydraulic pressure when switching between forward and backward drive in a vehicle, and is useful as a work vehicle.

The invention claimed is:

1. A work vehicle comprising:
an engine;
a hydraulic pump that is a variable displacement hydraulic pump driven by the engine;
a drive circuit through which flows hydraulic fluid discharged by the hydraulic pump;
a hydraulic motor driven by hydraulic fluid supplied via the drive circuit;
a drive wheel driven by the hydraulic motor;
a forward/backward switching member configured to be operated in order to indicate a switch between forward and backward drive of the vehicle;
a forward/backward detector configured to detect whether the vehicle is moving forward or backward;
a pump displacement control part configured to control the displacement of the hydraulic pump so that drive circuit hydraulic pressure, which is the pressure of the hydraulic fluid driving the hydraulic motor, does not surpass a predetermined cutoff pressure;
a vehicle speed detector configured to detect vehicle speed; and
a cutoff-pressure-setting part configured to set the cutoff pressure to a predetermined first pressure value when the vehicle speed is greater than a predetermined first speed threshold, and to set the cutoff pressure to a value greater than the first pressure value when the vehicle speed is equal to or less than a predetermined second speed threshold that is less than the first speed threshold;
wherein
the cutoff-pressure-setting part is configured to set the second speed threshold to a predetermined first value when forward drive is indicated by the forward/backward switching member and the forward/backward detector detects that the vehicle is moving forward, or when backward drive is indicated by the forward/backward switching member and the forward/backward detector detects that the vehicle is moving backward, and
the cutoff-pressure-setting part is configured to set the second speed threshold to a second value that is smaller than the first value when forward drive is indicated by the forward/backward switching member and the forward/backward detector detects that the vehicle is moving backward, or when backward drive is indicated by the forward/backward switching member and the forward/backward detector detects that the vehicle is moving forward.

2. The work vehicle according to claim 1, wherein the cutoff-pressure-setting part is configured to set the cutoff pressure to either the first pressure value or a second pressure value that is greater than the first pressure value.

3. The work vehicle according to claim 1, wherein the cutoff-pressure-setting part is configured to set the cutoff pressure to a value that changes between the first pressure value and a second pressure value that is greater than the first pressure value, according to the vehicle speed.

4. The work vehicle according to claim 1, wherein:
the pump displacement control part has a cutoff valve configured to change the cutoff pressure according to a supplied pilot pressure, and
the cutoff-pressure-setting part has an electromagnetic control valve configured to control a pilot pressure supplied to the cutoff valve according to an input command signal, and an electronic controller configured to output a command signal to the electromagnetic control valve and electrically control the electromagnetic control valve.

5. The work vehicle according to claim 1, further comprising
an accelerator operating member configured to be operated to indicate rotation rate of the engine, and
an accelerator operation amount detector configured to detect an operation amount of the accelerator operating member,
wherein the second value is set according to the operation amount of the accelerator operating member detected by the accelerator operation amount detector.

* * * * *